(12) United States Patent
Sauer (10) Patent No.: US 9,392,771 B1
(45) Date of Patent: Jul. 19, 2016

(54) SAFETY DEVICE FOR TETHERING A MOVING INDIVIDUAL

(71) Applicant: Bianka Sauer, Port Hueneme, CA (US)

(72) Inventor: Bianka Sauer, Port Hueneme, CA (US)

(*) Notice: Subject to any disclaimer, the term of this patent is extended or adjusted under 35 U.S.C. 154(b) by 0 days.

(21) Appl. No.: 14/924,933

(22) Filed: Oct. 28, 2015

(51) Int. Cl.
*A01K 27/00* (2006.01)

(52) U.S. Cl.
CPC .................................. *A01K 27/004* (2013.01)

(58) Field of Classification Search
CPC ... A01K 27/00; A01K 27/003; A01K 27/004; A01K 27/005
USPC ................... 119/769, 774, 792–799
See application file for complete search history.

(56) References Cited

U.S. PATENT DOCUMENTS

| | | | | |
|---|---|---|---|---|
| 2,275,701 A * | 3/1942 | Taylor | ................... | A01K 27/005 119/798 |
| 2,337,970 A * | 12/1943 | Cassell | ................ | A01K 27/005 119/799 |
| 3,964,441 A * | 6/1976 | Wall | ..................... | A01K 27/004 119/796 |
| 4,214,382 A * | 7/1980 | Matsutani | .......... | A63B 69/0028 273/DIG. 19 |
| 4,522,153 A * | 6/1985 | Vander Horst | ....... | A01K 27/005 119/799 |
| 4,530,310 A * | 7/1985 | Clarke | ................. | A01K 27/005 119/776 |
| 4,854,269 A | 8/1989 | Arntzen | | |
| 5,080,045 A | 1/1992 | Reese et al. | | |
| 5,215,037 A | 6/1993 | Allred | | |
| 5,813,368 A * | 9/1998 | Rasmussen | .......... | A01K 27/003 119/799 |
| 5,964,386 A | 10/1999 | Cote | | |
| 6,006,699 A * | 12/1999 | Keever | ................. | A01K 27/005 119/795 |
| 6,053,129 A * | 4/2000 | Akre | .................... | A01K 27/005 119/795 |
| 6,095,093 A | 8/2000 | Kisko et al. | | |
| 6,450,129 B1 | 9/2002 | Flynn | | |
| 7,013,840 B2 | 3/2006 | Leon | | |
| 7,017,526 B2 | 3/2006 | Chen | | |
| 7,384,382 B2 * | 6/2008 | Farrah | ................. | A63B 21/153 273/453 |
| 7,516,717 B2 | 4/2009 | David et al. | | |
| 7,900,586 B2 * | 3/2011 | Hamblen | ............ | A47D 13/086 119/770 |
| 7,926,452 B1 * | 4/2011 | Kim | ..................... | A01K 27/004 119/796 |
| 8,006,650 B2 | 8/2011 | Tollman | | |
| 2009/0044763 A1 | 2/2009 | Russo et al. | | |
| 2009/0139463 A1 | 6/2009 | Morrow | | |
| 2011/0005148 A1 | 1/2011 | Foster | | |
| 2013/0160719 A1 * | 6/2013 | Trombley | ........... | A01K 27/004 119/796 |

* cited by examiner

*Primary Examiner* — David Parsley
(74) *Attorney, Agent, or Firm* — Sandy LipKin (57) ABSTRACT

A stiff elongated tethering device into which a flexible, retractable leash can be housed for the walking, running or tethering of a dog. The elongated tethering device includes a housing for the leash and terminates on end with a loop and on the other end with an aperture for the extension therethrough of the flexible retractable leash. The loop attaches to a belt accessory that can be wrapped around a user's waist, a bicycle seat post, a wheelchair arm, a tree, a stake or any other substantially cylindrical device. The invention allows for a fixed area in which the dog can move and prevents the animal from hazardously moving in front of walkers, runners, and the wheels of wheelchairs and bicycles while at the same time allowing the user to remain hands-free if desired.

1 Claim, 11 Drawing Sheets

SAFETY DEVICE FOR TETHERING A MOVING INDIVIDUAL

BACKGROUND OF THE INVENTION

1. Field of the Invention

The field of this invention relates generally to the field of restraining devices, and more particularly toward a stiff extending member that be affixed to a moving individual, such as a dog or a child, on one end, and hands-free affixed to a human or other fixed device on the other end.

2. Description of the Prior Art

Humans have long kept domesticated animals as companions. One such animal is a dog. A dog requires and desires physical activity. The human responsible for the dog therefore has a duty to take the dog out into the confines beyond its home to walk and run. Most often in cities and elsewhere, the dogs need to be kept under control, usually with a leash that is a flexible tether that attaches to the collar or harness of the dog on one end and is held in the hand of the human on the other end.

There are some drawbacks to the traditional leashes in use for this purpose. First, because the human has to hold one end of the tethering leash in his or her hand, the use of at least one hand is restricted during this activity. Second, due to the flexibility of the traditional leash, the dog is free to move about in any direction it desires provided it is within the length of the leash. This includes moving in front of the human walking the dog. In the case of a human sitting in a wheelchair or riding a bicycle, there is the potential hazard of the dog moving into the wheels of the bicycle or wheelchair.

It is the object of the instant invention to provided an improved tethering device for dogs that overcomes the shortcomings of the prior art.

SUMMARY OF THE INVENTION

The basic embodiment of the present invention teaches an apparatus for tethering a dog a specific distance comprising: a stiff elongated member having a first end and a second end; a casing for the placement therein of a flexible, retractable leash attached to said first end of said stiff elongated member; a substantially circular loop attached to said casing wherein said substantially circular loop is openable and closeable; and an opening at said second end of said stiff elongated member wherein said flexible, retractable leash can be threaded therethrough.

The above embodiment can be further modified by defining that said stiff elongated member can telescope in or out to accommodate a variety of lengths.

The above embodiment can be further modified by defining that said apparatus is attachable to a belt accessory through said substantially circular loop, said belt accessory further comprising: a main strap for wrapping around a cylindrical object wherein said main strap is openable and closeable; one or more connecting loops attached to said main strap for connection thereto of said substantially circular loop.

The above embodiment can be further modified by defining that a semi-concentric loop is attached to said main strap of said belt accessory.

The above embodiment can be further modified by defining that said belt accessory further comprises a connecting member between said main strap and said one or more connecting loops thereby allowing said main strap and said one or more connecting loops to remain in the same plane.

The above embodiment can be further modified by defining that a stop member is placed between said connecting loop and said connecting member.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Turning to the drawings, the preferred embodiment is illustrated and described by reference characters that denote similar elements throughout the several views of the instant invention.

Figure 1:
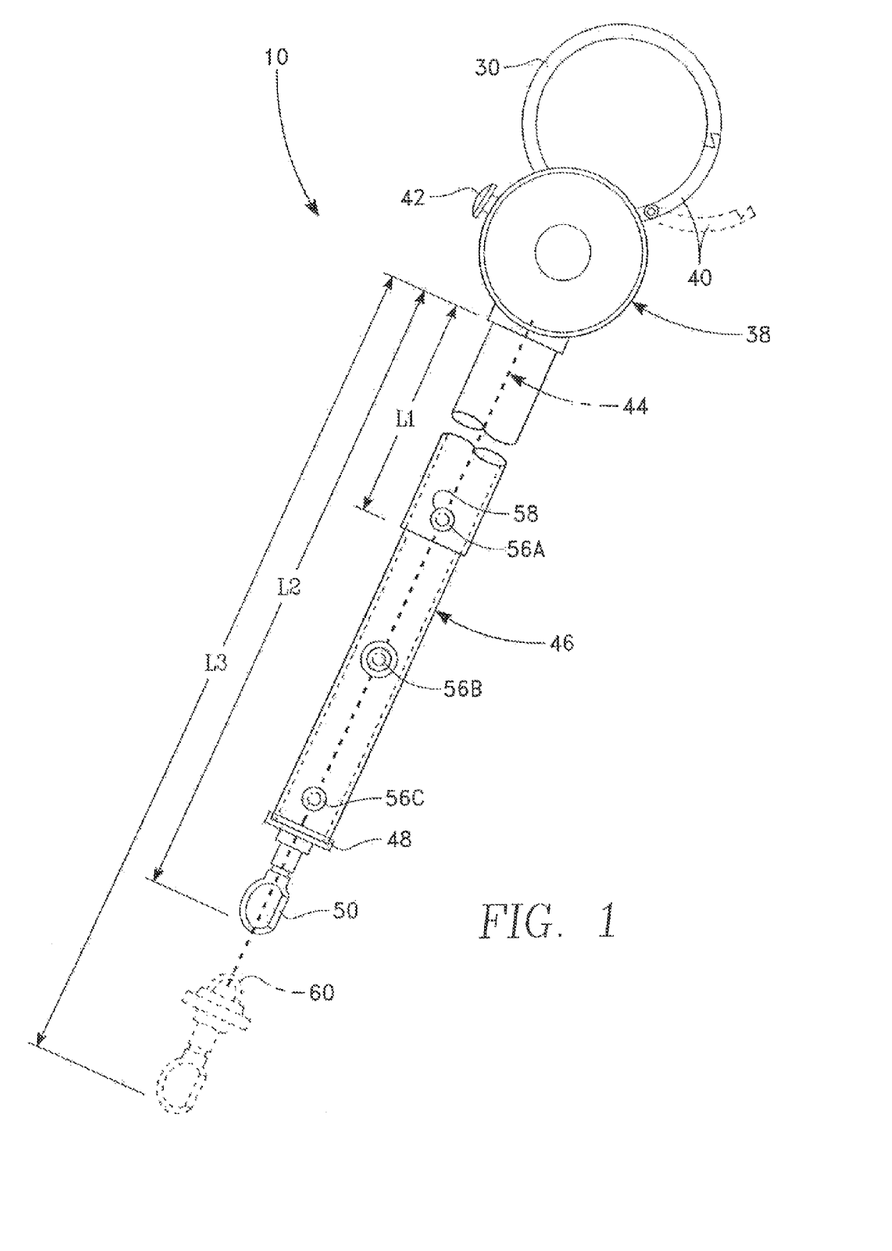
FIG. 1 shows a front view of the tethering device of the instant invention.
Figure 2:
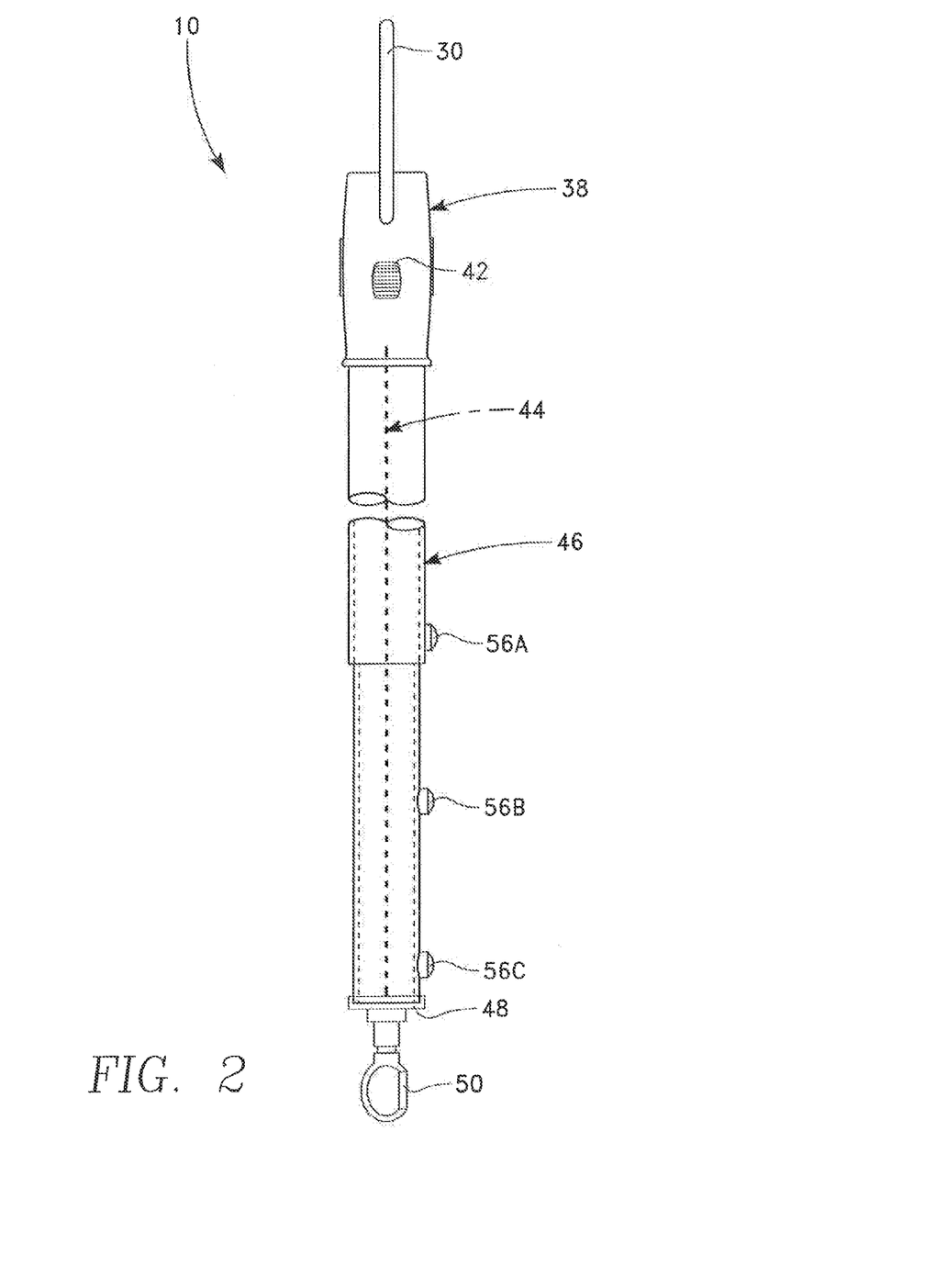
FIG. 2 shows a side view of the tethering device of the instant invention.
Figure 9:
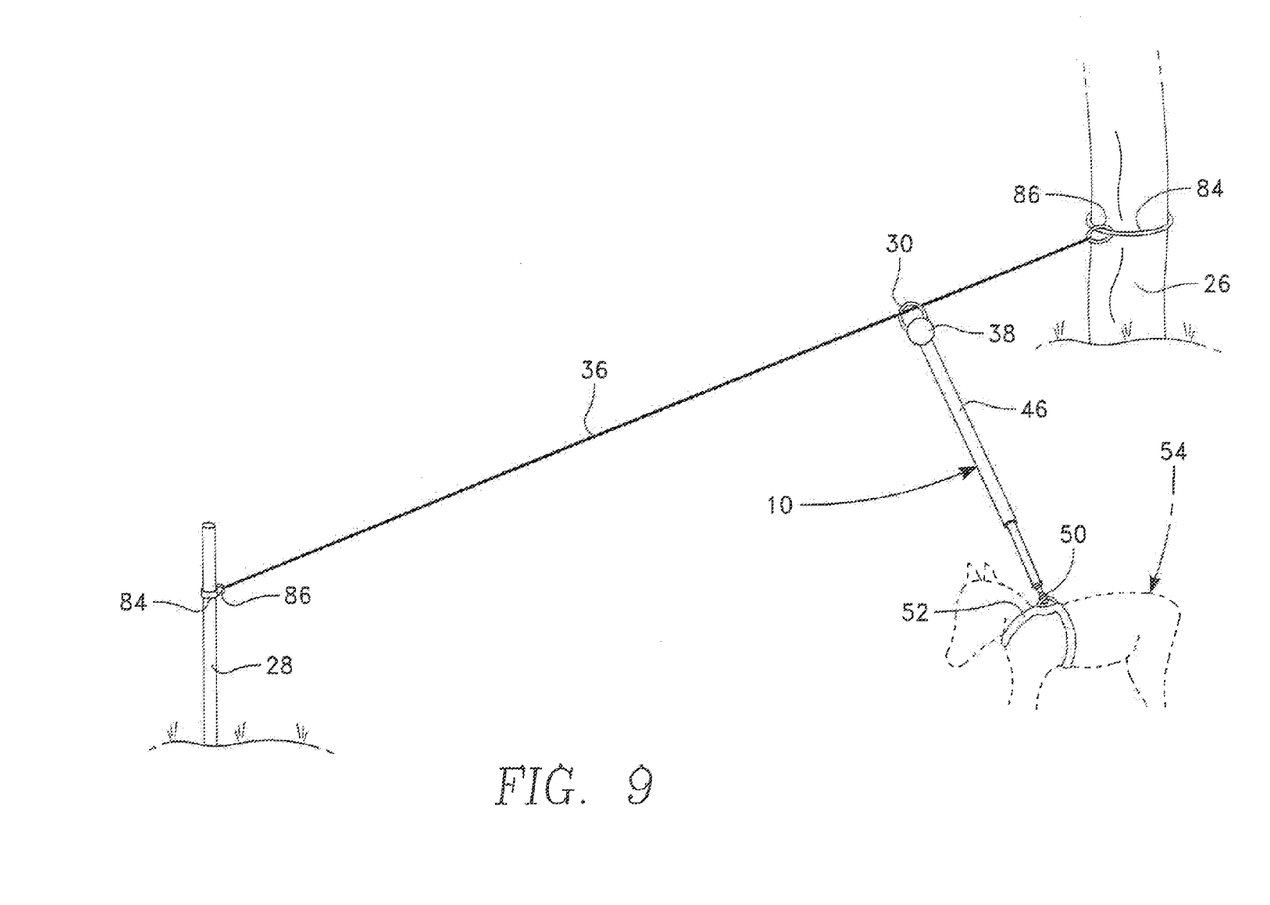
FIG. 9 shows perspective view of a tree and post using miniaturized versions of the belt accessory to attach thereto providing a controlled space across which the dog can be tethered.

The preferred embodiment provides for a stiff, tethering device 10 shown in detail in FIGS. 1-2 that can be either hand-held or attached to a belt accessory 12 that can then be attached to any number of items, including the waist 14 of the user 24, the arm 16 of a wheelchair 18, the seat post 20 of a bicycle 22, a tree 26 or a stake 28 or any other anchoring item. The tethering device is stiff and at the first end 30 there is a loop 32 that is substantially circular and has the ability to open and close through a separation 34. This separation 34 in the loop 32 allows the loop 32 to open an opening portion 40 that can attach and detach the tethering device 10 to a belt accessory 12 or a line 36 that is attached to more than one belt accessory 12 as seen in FIG. 9.

Proximate the loop 32 is an enclosed leash casing 38 that can be opened and closed through an opening latch 42 to allow for a flexible, retractable leash 44 to be placed therein. Proximate the leash casing 38 is the stiff, elongated portion 46 through which the retractable leash 44 extends. The stiff, elongated portion 46 terminates in an aperture 48 through which the clasping portion 50 of the retractable leash 44 can extend and attach to the collar 52 or harness or a dog 54.

The stiff, elongated portion 46 is adjustable in length and can have an indeterminate number of lengths as desired. As illustrated in FIG. 1 there is a first length L1 that can be achieved when the device 10 is telescoped into the closed position. L2 is a second length and L3 a third. The stiff, elongated portion 46 can be telescoped into a variety of lengths through the use of flanges 56A, 56B, 56C found on the inner telescoping portions that protrude through the aperture 58 on the outer telescoping portions. To adjust the size of the stiff, elongated portion 46, the inner telescoping portions are manipulated so that the flanges 56A, 56B, 56C align with the aperture 58 as desired for length and these portions are mated and held securely in place. As seen in FIG. 1, the retractable leash 44 will extend a certain distance beyond the termination aperture 48 to allow some slack 60 for the dog 54.

Figure 3:
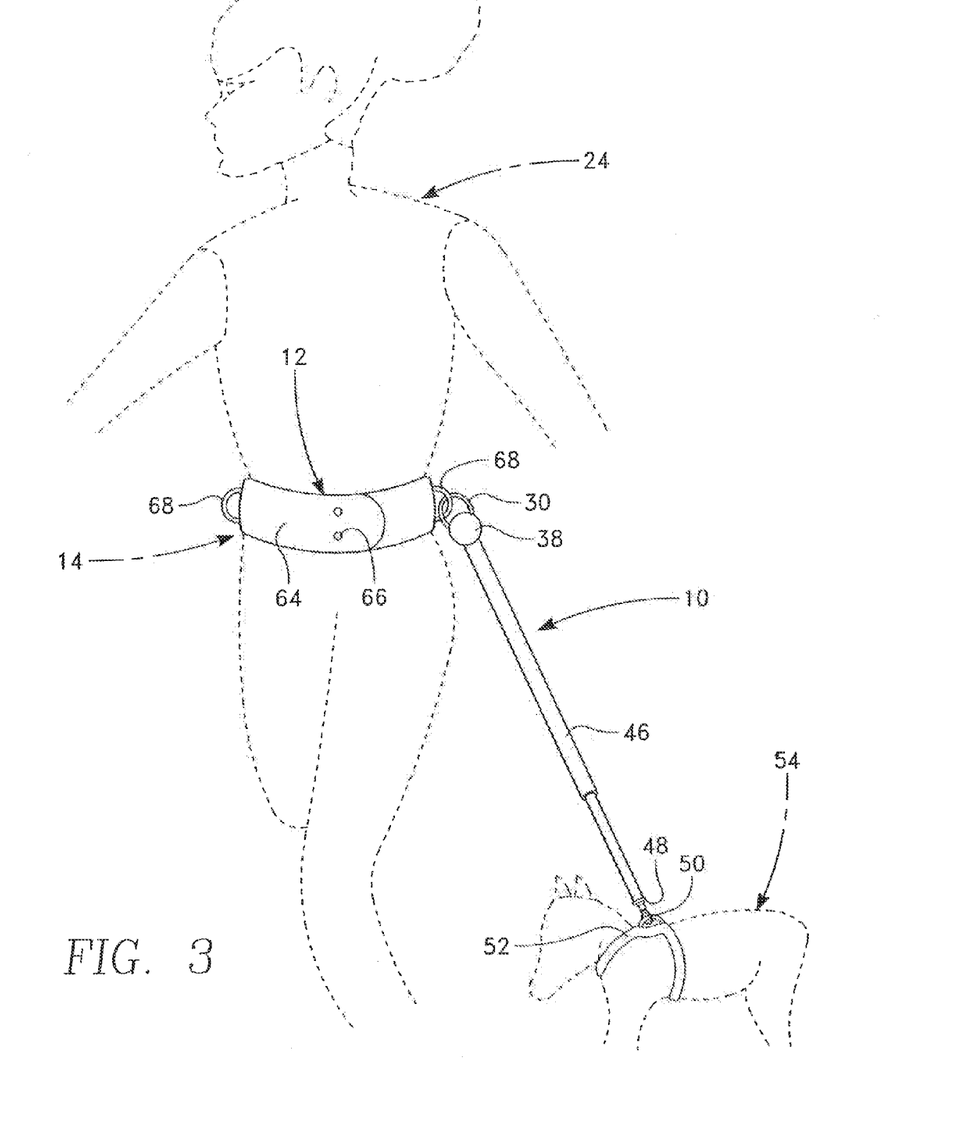
FIG. 3 shows the tethering device of the instant invention as it is attached to the belt accessory of the instant invention as the belt accessory is wrapped around the waist of the user and the tethering device is attached to a dog.
Figure 4:
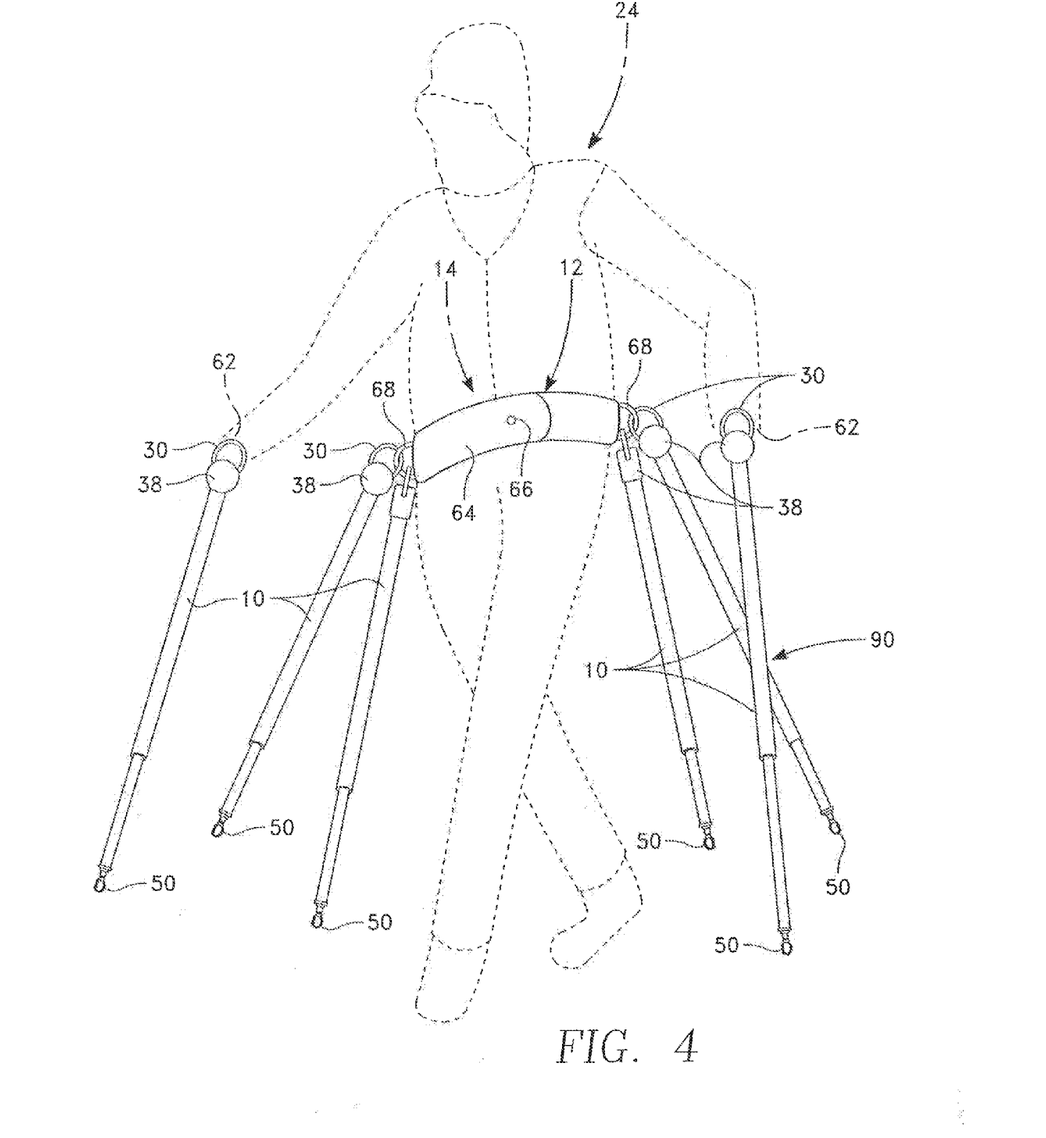
FIG. 4 shows a user using multiple tethering devices of the instant invention wherein multiple dogs can be walked and the tethering device is attached to the belt accessory of the instant invention and other tethering devices are in the hand of the user.
Figure 5:
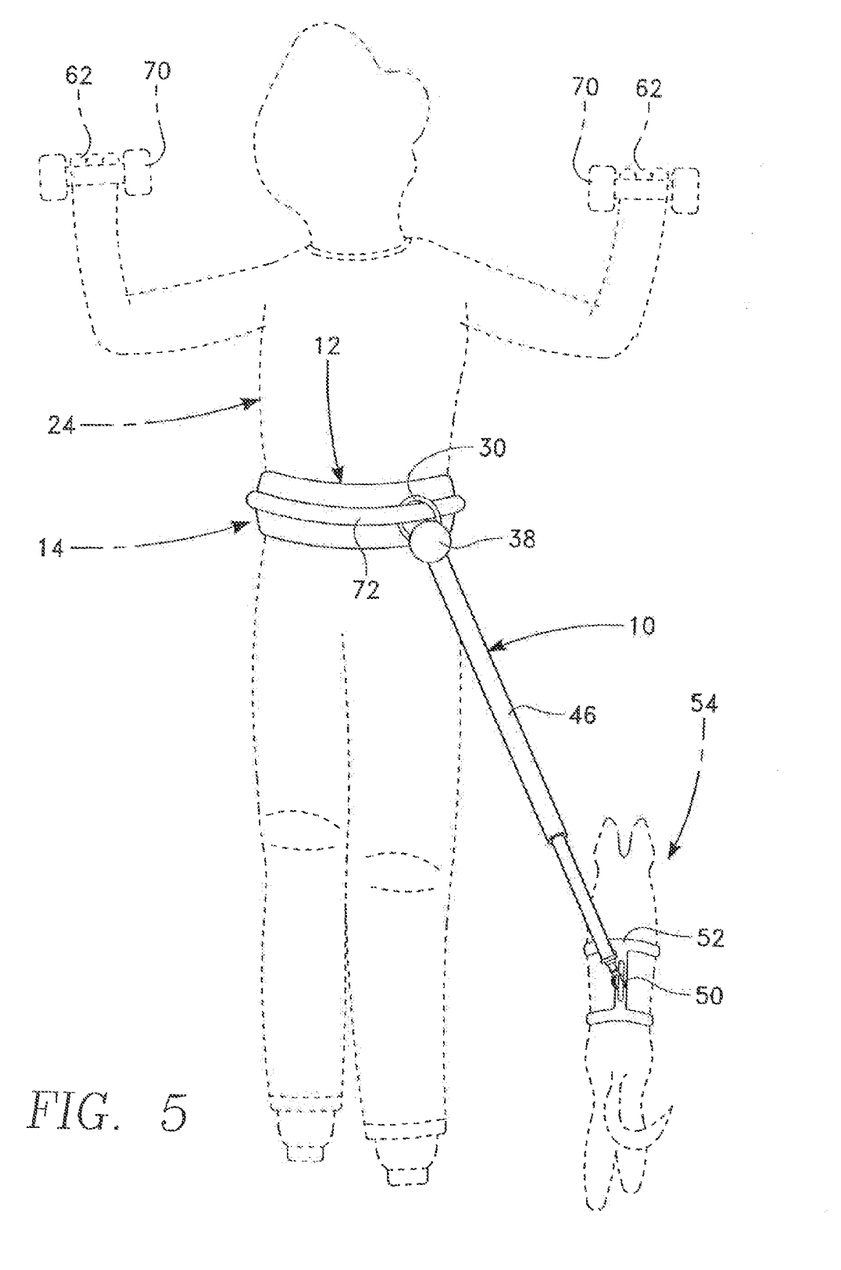
FIG. 5 shows a user from behind with the belt accessory of the instant invention around the user's waist while the user's hands are free and the tethering device is also attached to a dog.

FIGS. 3-9 illustrated how the tethering device 10 is used and attached to any number of items through the belt accessory 12. In FIGS. 3-5, the belt accessory 12 is of the larger size and is to be wrapped around the waist 14 of the human user 24 who is walking the dog 54. In FIG. 3, the user 24 has the belt accessory 12 wrapped around her waist 14 and her hands are free. In FIG. 4, the user 24 has the belt accessory 12 wrapped around his waist 14 and there are four tethering devices 10 attached to the belt accessory 12. In this illustration, the user 24 also has a tethering device 10 in each hand 62. In this illustration, the user 24 can walk multiple dogs and the dogs will be limited to the distance between the belt accessory 12 and the clasping portion 50 of the retractable leash 44. The advantage can be seen in these illustrations in that due to the stiffness and set length of the tethering device 10, the animal cannot move into a space in front of the user 24 or into the path of other dogs.

FIG. 5 shows the belt accessory 12 around the waist 14 of the user 24 from behind. From behind the semi-concentric loop 72 spreads across the rear of the waist 14 of the user 24 and allows for more movement of the dog 54 when behind. In this embodiment, the user is show with dumbbells 70 in her hands 62 emphasizing the hands-free benefit of the invention.

Figure 6A:
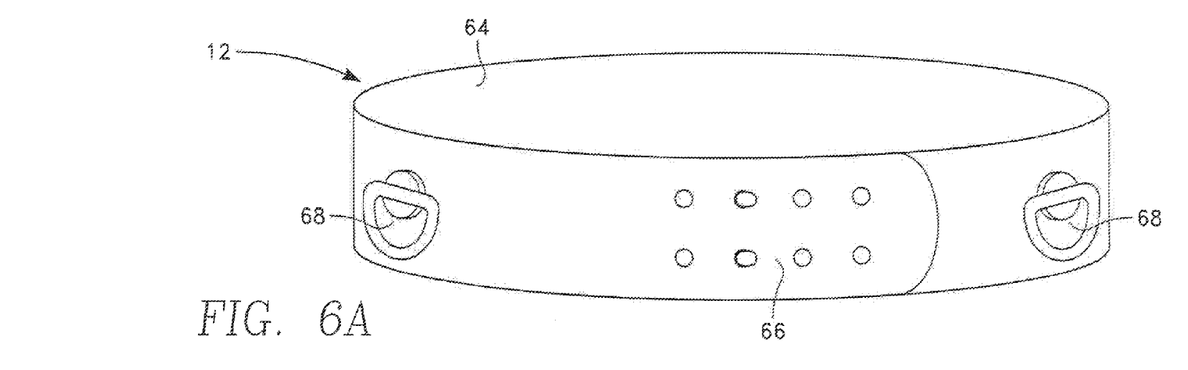
FIG. 6A is a front perspective view of the belt accessory of the instant invention.
Figure 6B:
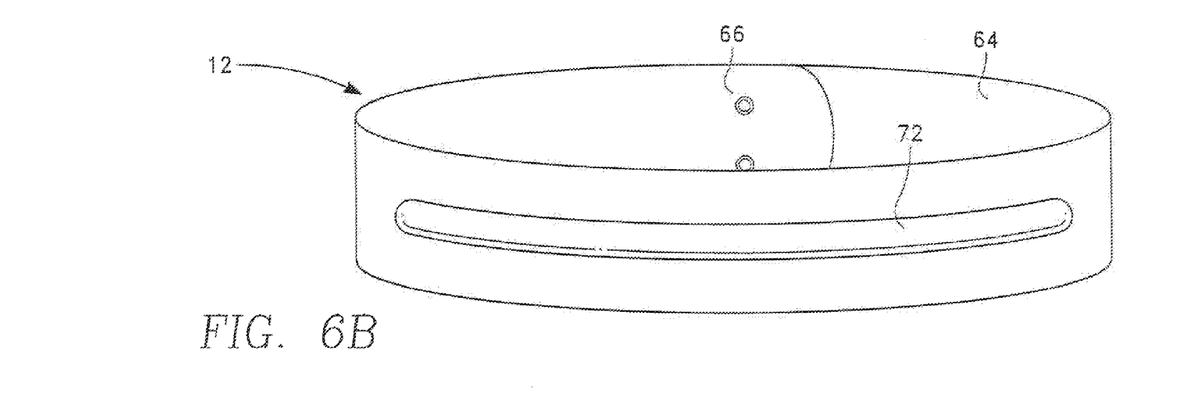
FIG. 6B is a rear perspective view of the belt accessory of the instant invention.
Figure 6C:
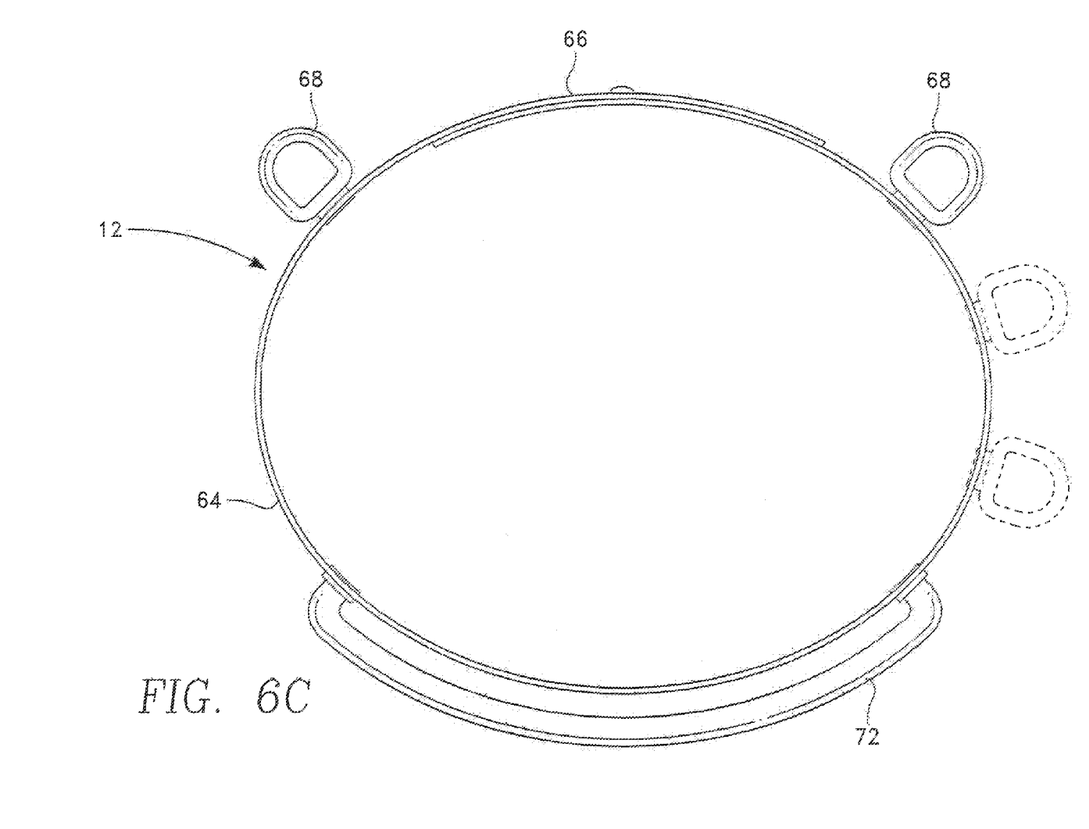
FIG. 6C is a top view of the belt accessory of the instant invention.

The belt accessory 12 of the instant invention is illustrated in detail in FIGS. 6A-6C. The belt 12 has a wrapping portion 64 that wraps around the waist 14 of the user 24 or any other substantially cylindrical object. The wrapping portion 64 terminates in a connection portion 66 that can be a belt, hook and loop, snaps, zippers and the like. As illustrated, snaps are shown. On the front side of the belt accessory 12 are one more loops 68 to which the loop 30 of the tethering device 10 can attach. On the rear of the belt accessory 12 is a semi-concentric loop 72 to which the loop 30 of the tethering device 10 can attach. An optional removable loop 74 can also be placed on the semi-concentric loop 72.

Figure 7:
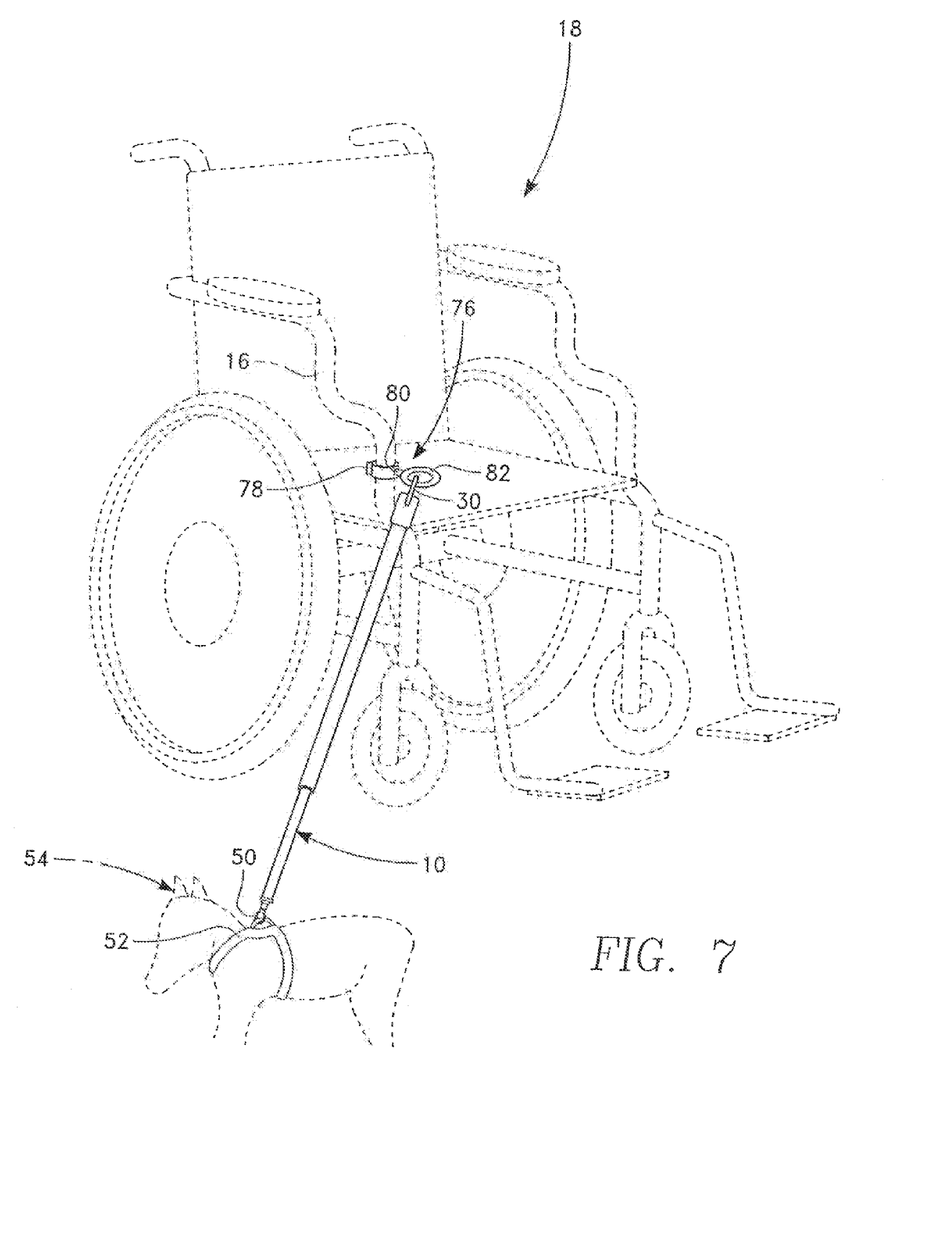
FIG. 7 is a side perspective view of a wheelchair using a miniaturized version of the belt accessory to attach to the arm of the wheelchair providing a space for the tethering device to be attached thereto.
Figure 8A:
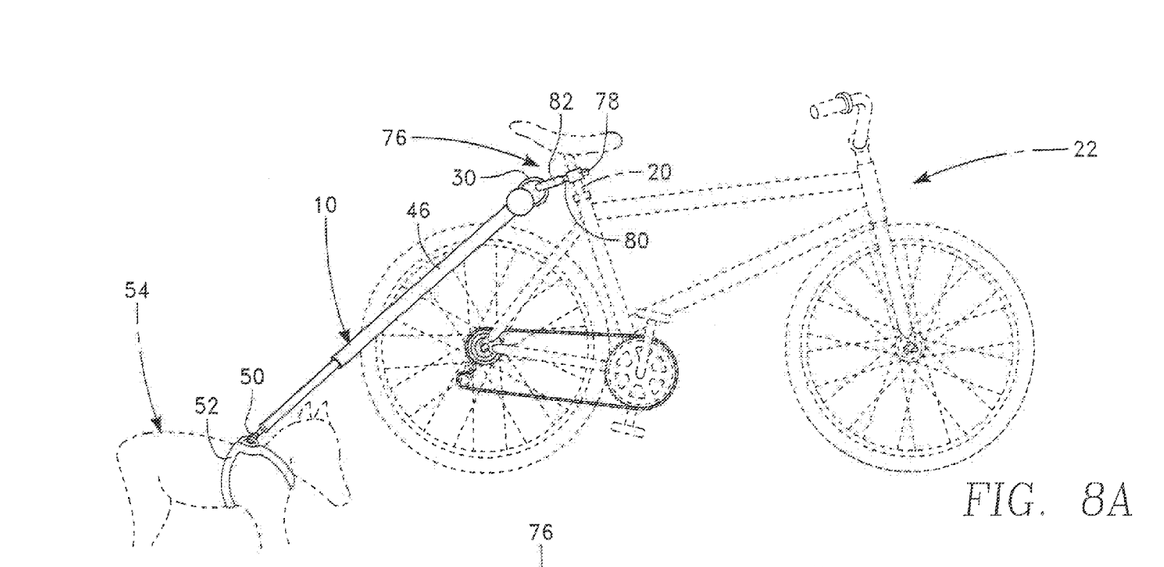
FIG. 8A is a side view of a bicycle using the miniaturized version of the belt accessory to attach to the seat post of the bicycle providing a space for the tethering device to be attached thereto.
Figure 8B:
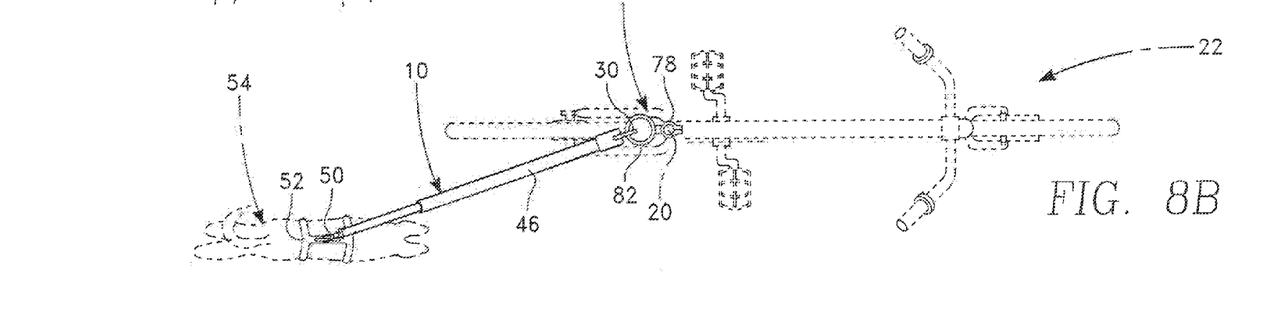
FIG. 8B is a top view of a bicycle using the miniaturized version of the belt accessory to attach to the seat post of the bicycle providing a space for the tethering device to be attached thereto.

An alternate embodiment of the belt accessory is the miniaturized belt accessory 76 as shown in FIGS. 7-8B. The miniaturized belt accessory 76 allows the belt to be attached to something smaller than the waist of a human. In FIG. 7 the miniaturized belt accessory 76 is attached to the arm 16 of a wheelchair 18. The miniaturized belt accessory 76 has a first loop 78 that attaches to the arm 16 of the wheelchair. A connecting part 80 connects the first loop 78 to the second loop 82 to which the loop 30 of the tethering device can attach. The user of the wheelchair 18 benefits from the dog 54 having limited range due to the rigidity of the tethering device 10 and the fixed length.

In FIGS. 8A-8B the same miniaturized belt accessory 76 as shown in the wheelchair embodiment of FIG. 7 can be used on the seat post 20 of a bicycle 22.

Another embodiment of the belt accessory is shown in FIG. 9. In this embodiment, the miniaturized belt accessory 84 attaches to a tree 26 or a stake 28 or other fixed vertical item that is substantially cylindrical. The miniaturized belt accessory 84 is primarily a loop attached to the tree 26 or stake 28 with secondary loop 86 linked thereto to which a line 36 can be attached to attach to a second miniaturized belt accessory 84 attached to a second tree 26 or stake 28. The loop portion 30 of the tethering device 10 can then be attached to the line 36 thereby allowing the dog to move easily between the tree 26 and the stake 28 allowing more range of movement than had the dog 54 been tethered to just one or the other of the tree 26 and stake 28.

Figure 10:
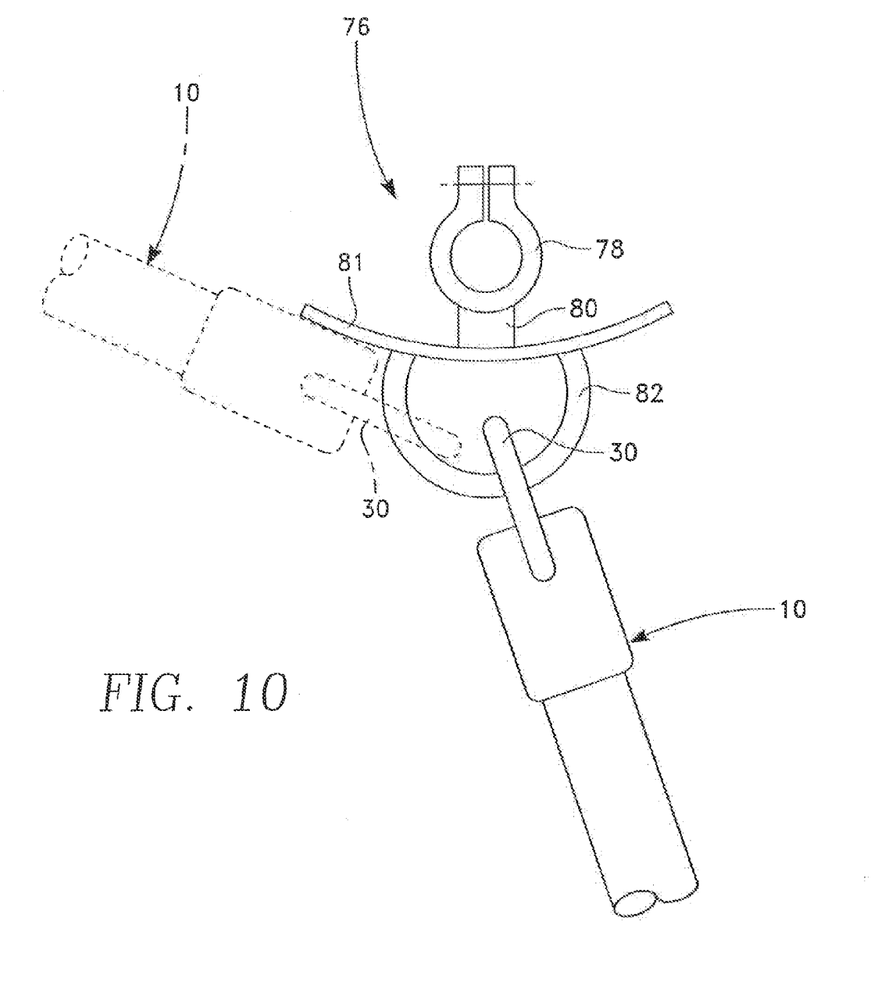
FIG. 10 shows a close up view of the attachment point on the belt accessory of the instant invention.

A close up of the attachment point to the belt accessory 78 for the wheelchair/bicycle seat post embodiment is shown in FIG. 10. The loop 82 for the leash 10 can include a stop member 81 so that the stiff elongated portion 46 does not rotate around and pinch the leg of the rider on the bicycle 22 or the person in the wheelchair 18.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A method for tethering a dog a specific distance from a person or item to which said dog is tethered in order to prevent a collision with said dog and said person or item during use comprising:
   attachment of a stiff, unbendable tether to said dog to said person or item, said tether further comprising
      a stiff, unbendable elongated member having a first end and a second end;
      a casing for the placement therein of a flexible, retractable leash attached to said first end of said stiff elongated member;
      a substantially circular loop attached to said casing wherein said substantially circular loop is openable and closeable; and
      an opening at said second end of said stiff, unbendable elongated member wherein said flexible retractable leash can be threaded therethrough wherein said flexible retractable leash can extend from said opening only a short fixed distance sufficient to allow attachment of said leash to said dog so that said dog remains at a fixed distance from said person or item and cannot cross over into the path in front of the user or item to which said dog is tethered
   wherein said tether is attachable to a belt accessory through said substantially circular loop, said belt accessory further comprising:
      a main strap for wrapping around a cylindrical object wherein said main strap is openable and closeable;
      one or more connecting loops attached to said main strap for connection thereto of said substantially circular loop
   wherein a semi-concentric loop is attached to said main strap of said belt accessory and
   wherein said belt accessory further comprises a connecting member between said main strap and said one or more connecting loops thereby allowing said main strap and said one or more connecting loops to remain in the same plane and wherein a stop member is placed between said connecting loop and said connecting member;
   allowing said dog to move in any direction allowable by said tether but not allowing said dog to cross in front of the path of said person or object to which it is tethered thereby avoiding collisions and accidents wherein said tether can be quickly released as needed.

* * * * *